UNITED STATES PATENT OFFICE 2,570,947

DRILLING FLUIDS AND METHODS OF USING SAME

Chester M. Himel, Bartlesville, and Edison G. Lee, Oklahoma City, Okla., assignors to Phillips Petroleum Company, a corporation of Delaware No Drawing. Application November 5, 1945, Serial No. 626,897

12 Claims. (Cl. 252—8.5)

This invention relates to drilling fluids. In one of its more specific aspects, it relates to a drilling fluid comprising water soluble celluloses which are not precipitated nor regenerated in any substantial degree by dilution with water and/or the usual salt containing connate water of an oil well formation nor by the heat or cold generally obtainable in a well. In another specific aspect, it relates to a drilling fluid comprising water soluble hydroxyalkylcelluloses, such as hydroxyethylcellulose; and to the methods of use of such celluloses for controlling viscosity, gel strength, water loss and filter cake thickness of oil well drilling fluids.

In the art of drilling wells, especially drilling wells by the rotary method, it is necessary to use a drilling mud or drilling fluid, as is well understood in the art. The drilling mud lubricates the drill stem, carries the cuttings to the surface of the well, cools the drill bit, and forms a filter cake on the walls of the well preventing loss of at least any substantial amount of water from the drilling mud to the natural formations of the well. In order to perform these important functions properly, the drilling mud must have suitable viscosity and other qualities at all times in spite of adverse conditions encountered in drilling the well.

Sometimes in drilling through certain substantially water soluble formations, which formations are dissolved and dispersed by the action of the drill bit, the drilling fluid has its viscosity raised too high so that gas bubbles will not escape properly from the drilling fluid especially if the initial gel strength is high, which tends to lighten the drilling mud and increase the danger of a blow out. Also, the increased viscosity causes a loss of power in rotating the bit and in extreme cases may result in twisting the drill string in half. The control of viscosity provided by the present invention is, therefore, important.

Drilling fluids contaminated by said substantially water soluble formations also often form filter cakes on the formation which are too thick and/or too hard. A thick filter cake is also generally an indication of excessive loss of water to the formation. Pure water, suitable for drilling, is hard to obtain in some locations, but everywhere its loss to the formation is to be avoided as such lost water is absorbed by the formation and may cause heaving or swelling of the formation. A thick filter cake is easily knocked off by movements of the drill string, especially if hard and brittle, with resultant further water loss at the bare spot and possible jamming of the bit in the hole by falling pieces of filter cake. The ideal filter cake is very thin, quite soft and flexible and prevents substantially any water loss.

The principal object of our invention is to produce a drilling mud which can be used in all formations with reduced water loss, thin filter cake, and controlled viscosity and gel strength.

Another object is to provide an improved drilling fluid.

Another object is to provide an improved method of drilling.

Another object is to provide a drilling mud additive suitable for controlling viscosity, gel strengths, water and filter cake thickness of well drilling fluids.

Another object is to provide a drilling mud containing a water soluble cellulose which is not precipitated or regenerated in any substantial degree by dilution with water and/or connate water, such as a suitable hydroxyalkylcellulose.

Numerous other objects and advantages of this invention will be apparent to those skilled in the art upon reading the accompanying specification and claims.

In the present invention we prefer to employ as a colloidal suspending or dispersing agent in a drilling mud a water soluble cellulose such as a hydroxyalkylcellulose. Such a hydroxyalkylcellulose in the quantities we use in a drilling mud is not precipitated or regenerated by dilution with water and/or the usual salt containing connate water. Nor is it precipitated by heat or cold generally obtainable in a well, or regenerated by aging or ripening as it is a substantially stable substance. Substances which precipitate or regenerate under the above conditions we find are not suitable for use in drilling mud, although they may find some use as plugging agents for plugging wells, and, therefore, are not related to the present invention. Such plugging agents would soon precipitate and fill the mud pit and also choke the drill stem in the hole.

The amount of said water soluble cellulose derivative employed can be varied as even small amounts give a corresponding smaller effect. We have found that amounts similar to those used in the specific examples below give suitable results as will be obvious to those skilled in the art who can thereby calculate the approximate effect of still other proportions of said materials.

The cellulose derivative of this invention may be in dried powder form, the particle size not being critical. However, for rapid solution a particle size where 95% will pass an 80 mesh screen is useful. In order to speed up the solution of the chosen water soluble cellulose derivative, a suitable wetting agent may be added first.

In rotary drilling the methods consist in adding the hydroxyalkylcellulose powder, which may be added to the drilling fluid flowing in the mud ditch to the pump intake; or to the mud pit; by scattering the powder over the surface. An alternative method would be to make up a more or less concentrated solution of the hydroxyalkylcellulose and add that in a stream to the drilling mud. In some instances, a pure mixture of water and hydroxyalkylcellulose may be used as the well drilling or well controlling fluid, but mud is generally added. The drilling fluid containing the cellulose derivative and water is pumped in circulation or reverse circulation in the drill string or used to fill or partially fill the well in the usual operations of well drilling and well controlling of the prior art. When so used in a sufficient amount, a new result is achieved in that salt water does not cut the mud qualities enough to harm it for drilling and formations exposed to it do not cave or heave enough to stop the drilling. Suitable control or mud treating agents may be used, such as phosphates and/or quebracho if desired.

We have found that hydroxyethers of cellulose, especially hydroxyalkylcelluloses such as hydroxyethyl, and hydroxypropyl celluloses give improved results. Hydroxyethylcellulose gives excellent results and the higher hydroxyalkylcelluloses, while not as effective, have some degree of usefulness. Di(hydroxyethyl)- and di-(hydroxypropyl)celluloses and other di(hydroxyalkyl)celluloses are useful while hydroxyalkyl dicelluloses are also useful. The compounds in the last sentence are all hydroxyalkylcelluloses and all have degrees of usefulness. Polyglycol cellulose is another useful hydroxyalkylcellulose.

Hydroxyalkyl ethers of cellulose may be formed by the same type reactions as reacting ethylene oxide with alkalicellulose. Hydroxyalkyl ethers of cellulose may also be prepared by allowing halogen hydrins of polyalcohols such as, for example, glycol chlorohydrin to act upon alkalicellulose, likewise, the action of glycerol a-monochlorohydrin upon alkalicellulose results in the formation of (2,3 - dihydroxy)propylcellulose. Other methods may be used to make them.

Any use of a water soluble cellulose to be retained as a soluble dispersing agent throughout the entire normal life of the drilling mud is not to be confused with the use of some alkali or acid soluble cellulose which is to be precipitated as an insoluble plugging agent in the formation. Nor is the use of a water soluble cellulose which is substantially stable to heat or cold or aging or ripening or dilution by water or salts of connate water to be confused with plugging agents which are deliberately precipitated by such heat or cold or aging or dilution. We do not use our water soluble cellulose as a plugging agent at all, and while calcium ions present in a connate water in a subterranean formation may form a colloidal haze of supposedly insoluble calcium cellulose salts and while this colloidal calcium cellulose may contact the formation, such colloidal material is not comparable to the immediate precipitation of relatively massive insoluble plugging material formed by alkali or acid soluble celluloses upon removal or dilution of the alkali or acid. The haze of calcium cellulose formed from water soluble celluloses is colloidal and does not precipitate under ordinary conditions.

The mode or theory of operation by which our water soluble hydroxyalkylcelluloses protect the surface of clay or bentonite from attack by water is obscure; it is believed that as the water attempts to enter the clay the hydroxyalkylcellulose forms a layer of a protective material on the outside of the clay or bentonite preventing the clay or bentonite from absorbing the water from the drilling mud.

Drilling muds containing water soluble cellulose derivatives of this invention are not subject to injury by salt to any detrimental degree, but may still be useful as drilling muds when there is as much in some instances as 275,000 parts per million of sodium chloride in the drilling mud or more.

Our drilling muds containing water soluble hydroxyalkylcelluloses often have low initial gel strength which allows gas bubbles to come out of the drilling mud so rapidly that the drilling mud will not become gas cut. Elimination of gas cutting reduces the chances of blowouts. Our drilling muds are often characterized by very thin filter cake thickness and by very small water loss or complete absence of water loss. This is very useful in avoiding loss of water to the formation, as well as the resultant swelling or caving of the formation which occurs with some formations. They do not generally ferment or spoil. Numerous other advantages of our drilling muds will be apparent from a study of the following representative experiments which have been selected to show in a minimum of space the advantages of drilling muds containing water soluble hydroxyalkylcelluloses.

TESTS

The tests of the properties of solutions of water soluble hydroxyalkylcelluloses and/or drilling muds were all made with standard drilling and laboratory equipment.

The measurements of pH were all made with a Beckman "Industrial Model M" pH meter. The viscosity measurements were all made with a Stormer viscosimeter 1931 model made by Arthur H. Thomas Company. The mixing of samples was always for 15 minutes with a Hamilton Beach No. 33 high speed mixer. Sodium chloride content was calculated from a determination of the chlorine ions by titration with silver nitrate using a potassium chromate indicator. The filter cake thickness and water losses were all determined with an "A. P. I. low pressure wall building tester filter press" with a pressure of 100 lbs. per square inch applied for 30 minutes. All temperatures were approximately room temperature. All barrels are 42 U. S. gallon barrels.

(A) *Properties of base mud used in experiment*

Weight, pounds per gallon_____ 11.8
Viscosity, Stormer, Cpe_____ 76
Gel strength, Stormer, initial_____gm__ 80
Gel strength, Stormer, 10 min_____gm__ 150
Water loss, 30 min. @ 100 p. s. i_____cc__ 88
Filter cake thickness_____inches__ 22/64
pH _____ 6
Total chlorides, P. P. M_____ 275,000

(B) *Base mud treated with hydroxylethylcellulose in the proportion of 1 pound per barrel of mud*

| | |
|---|---|
| Weight, pounds per gallon | 11.8 |
| Viscosity, Stormer, Cpe | 18 |
| Gel strength, Stormer, initial_____gm | 26 |
| Gel strength, Stormer, 10 min_____gm | 40 |
| Water loss, 30 min. @ 100 p. s. i_____cc | 74.5 |
| Filter cake thickness_____inches | 18/64 |
| pH | 6 |
| Total chlorides, P. P. M | 275,000 |

(C) *Base mud treated with hydroxyethylcellulose in the proportion of 3 pounds per barrel of mud*

| | |
|---|---|
| Weight, pounds per gallon | 11.8 |
| Viscosity, Stormer, Cpe | 12 |
| Gel strength, Stormer, initial_____gm | 2 |
| Gel strength, Stormer, 10 min_____gm | 45 |
| Water loss, 30 min. @ 100 p. s. i_____cc | 36 |
| Filter cake thickness_____inches | 12/64 |
| pH | 6 |
| Total chlorides, P. P. M | 275,000 |

(D) *Base mud treated with hydroxylethylcellulose in the proportion of 5 pounds per barrel of mud*

| | |
|---|---|
| Weight, pounds per gallon | 11.8 |
| Viscosity, Stormer, Cpe | 10 |
| Gel strength, Stormer, initial_____gm | 0 |
| Gel strength, Stormer, 10 min_____gm | 10 |
| Water loss, 30 min. @ 100 p. s. i_____cc | 18 |
| Filter cake thickness_____inches | 3/64 |
| pH | 6 |
| Total chlorides, P. P. M | 275,000 |

(E) *Base mud treated with hydroxylethylcellulose in the proportion of 7 pounds per barrel of mud*

| | |
|---|---|
| Weight, pounds per gallon | 11.8 |
| Viscosity, Stormer, Cpe | 21 |
| Gel strength, Stormer, initial_____gm | 0 |
| Gel strength, Stormer, 10 min_____gm | 12 |
| Water loss, 30 min. @ 100 p. s. i_____cc | 2.5 |
| Filter cake thickness_____inches | 3/64 |
| pH | 6 |
| Total chlorides, P. P. M | 275,000 |

(F) *Base mud treated with hydroxyethylcellulose in the proportion of 10 pounds per barrel of mud*

| | |
|---|---|
| Weight, pounds per gallon | 11.8 |
| Viscosity, Stormer, Cpe | 44 |
| Gel strength, Stormer, initial_____gm | 0 |
| Gel strength, Stormer, 10 min_____gm | .5 |
| Water loss, 30 min. @ 100 p. s. i_____cc | 1 |
| Filter cake thickness_____inches | 3/64 |
| pH | 6 |
| Total chlorides, P. P. M | 275,000 |

(G) *Base mud treated with hydroxyethylcellulose in proportion of 10 pounds per barrel of mud and then pH raised to value of 9.0 with soda ash ($Na_2CO_3$)*

| | |
|---|---|
| Weight, pounds per gallon | 11.8 |
| Viscosity, Stormer, Cpe | 40 |
| Gel strength, Stormer, initial_____gm | 2 |
| Gel strength, Stormer, 10 min_____gm | 19 |
| Filter cake thickness_____inches | 3/64 |
| pH | 9 |
| Total chlorides, P. P. M | 275,000 |

Note how the initial gel strength of 80 grams in Example A (which is considered excessive by those skilled in the art) was reduced to 26 grams by the addition of only 1 pound of hydroxyethylcellulose per barrel of mud in Example B which is a great improvement, but is still a little higher than that of a typical drilling mud. Note that in Example C the addition of only 3 pounds of hydroxyethylcellulose per barrel of mud resulted in an initial gel strength of 2 grams which is a suitable value to prevent gas cutting of the mud. Note that in Examples D, E, and F, the initial gel strength reaches 0 and, therefore, little gas could be retained.

Note how the filter cake thickness of 22/64" in Example A (which is excessive) has been reduced to a normal value of 12/64" in Example C, and further reduction to 3/64" is achieved in Example F.

It should be noted that the drilling mud dealt with in Examples A to G, inclusive, is what is known as a salt cut drilling mud as the total chlorides in parts per million was 275,000. It is much harder to control viscosity, gel strength, water loss, and filter cake thickness in a salt cut mud than in an ordinary well drilling mud.

Note how the viscosity in Example A, which is 76 centipoises (which is excessive), is reduced to a suitable viscosity of 18 centipoises in Example B by the addition of only 1 pound of hydroxyethylcellulose per barrel of mud.

Note how the water loss of 88 cubic centimeters of Example A (which is excessive) is reduced to a favorable figure of 36 cubic centimeters in Example C and is reduced down to 1 cubic centimeter in Example F.

Note in Example G that soda ash ($Na_2CO_3$) is compatible with hydroxyethylcellulose.

A solution of 4 pounds of hydroxyethylcellulose per barrel of water was mixed with greater than the usual maximum proportions of caustic soda, phosphates (commercially sold as "Calgon") and/or quebracho as used in starch drilling mud and no changes were observed. The tests were made with both one and two chemicals added to the solution, and with hydroxyethylcellulose.

The above simple experiments are merely representative and are given merely to show why water soluble hydroxyethylcellulose containing drilling muds with or without alkali metal halogen salts or alkaline earth metal halogen salts are valuable in drilling where salt contamination, or heaving or caving conditions, or both, are encountered.

It is understood that while a theory of operation has been advanced, it is not the only or necessary one, but has been advanced only to facilitate the disclosure. It is understood, however, that this invention is not limited to any theory of operation or action. It is further obvious that various changes may be made in the details without departing from the spirit of this invention, nor from the scope of the invention as defined in the following claims. Obviously, use in aqueous mud laden fluids includes use in the aqueous phase of an emulsion with non-aqueous material. It is understood the invention is not to be limited to the specific details described. For example, calcium salts may form a white haze of colloidal nature in the solution and the solution will still be substantially a solution of a water soluble hydroxyalkylcellulose. For example, the tests with treating and control agents indicate that water soluble hydroxyalkylcelluloses are somewhat inert chemically and that all the treating and control agents of the well drilling fluid and well controlling fluid arts may, after a simple test for solubility and lack of obvious adverse reaction, be employed without invention in our drilling and controlling fluids containing water soluble hydroxyalkylcelluloses, and that with few if any exceptions they will be so employable. Our invention is, therefore, to be defined by the following claims.

Having described our invention, we claim:

1. In the process of drilling wells comprising the steps of drilling the well with well drilling tools, and circulating through the well during said drilling a water base drilling mud which forms a filter cake on the wall of the well, the improvement comprising incorporating in said drilling mud a water soluble hydroxyalkylcellulose in an amount sufficient to reduce the water loss due to filtration through said filter cake but insufficient to increase the viscosity of said drilling mud to such an extent that it cannot be circulated.

2. In the process of drilling wells comprising the steps of drilling the well with well drilling tools, and circulating through the well during said drilling a water base drilling mud which forms a filter cake on the wall of the well, the improvement comprising incorporating in said drilling mud a water soulble hydroxyethylcellulose in an amount sufficient to reduce the water loss due to filtration through said filter cake but insufficient to increase the viscosity of said drilling mud to such an extent that it cannot be circulated.

3. In the process of drilling wells comprising the steps of drilling the well with well drilling tools, and circulating through the well during said drilling a water base drilling mud which forms a filter cake on the wall of the well, the improvement comprising incorporating in said drilling mud a water soluble hydroxypropylcellulose in an amount sufficient to reduce the water loss due to filtration through said filter cake but insufficient to increase the viscosity of said drilling mud to such an extent that it cannot be circulated.

4. A water base well drilling mud comprising in combination sufficient water to maintain the mud as a fluid, sufficient clayey material to form a filter cake on the wall of the well, and a water soluble hydroxyalkylcellulose in an amount sufficient to reduce the water loss due to filtration through said filter cake without increasing the viscosity of said well drilling mud to such an extent that it cannot be circulated.

5. A water base well drilling mud comprising in combination sufficient water to maintain the mud as a fluid, sufficient clayey material to form a filter cake on the wall of the well, and a water soluble hydroxyethylcellulose in an amount sufficient to reduce the water loss due to filtration through said filter cake without increasing the viscosity of said well drilling mud to such an extent that it cannot be circulated.

6. A water base well drilling mud comprising in combination sufficient water to maintain the mud as a fluid, sufficient clayey material to form a filter cake on the wall of the well, and a water soluble hydroxypropylcellulose in an amount sufficient to reduce the water loss due to filtration through said filter cake without increasing the viscosity of said well drilling mud to such an extent that it cannot be circulated.

7. A water base drilling mud comprising an aqueous fluid mixture containing suspended solids which form a filter cake on the walls of the well, and a water soluble hydroxyalkylcellulose in an amount sufficient to reduce the water loss due to filtration through said filter cake without increasing the viscosity of said well drilling mud to such an extent that it cannot be circulated.

8. A water base drilling mud comprising an aqueous fluid mixture containing suspended solids which form a filter cake on the walls of the well, and a water soluble hydroxyethylcellulose in an amount sufficient to reduce the water loss due to filtration through said filter cake without increasing the viscosity of said well drilling mud to such an extent that it cannot be circulated.

9. A water base drilling mud comprising an aqueous fluid mixture containing suspended solids which form a filter cake on the walls of the well, and a water soluble hydroxypropylcellulose in an amount sufficient to reduce the water loss due to filtration through said filter cake without increasing the viscosity of said well drilling mud to such an extent that it cannot be circulated.

10. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble hydroxyalkylcellulose in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

11. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble hydroxyethylcellulose in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

12. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble hydroxypropylcellulose in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

CHESTER M. HIMEL.
EDISON G. LEE.

(References on following page)

REFERENCES CITED

The following references are of record in the file of this patent:

UNITED STATES PATENTS

| Number | Name | Date |
|---|---|---|
| 2,129,913 | Cross et al. | Sept. 13, 1938 |
| 2,184,564 | Oxley et al. | Dec. 26, 1939 |
| 2,336,171 | Freeland et al. | Dec. 7, 1943 |
| 2,337,296 | Kennedy et al. | Dec. 21, 1943 |
| 2,364,434 | Foster | Dec. 5, 1944 |
| 2,425,768 | Wagner | Aug. 19, 1947 |

OTHER REFERENCES

Marsh and Wood: Introduction to the Chemistry of Cellulose, pages 267 and 268 (1938).

Bock: Water-Soluble Cellulose Ethers, article in Ind. & Eng. Chem., vol. 29, pages 985–987, September 1937.

Chaney: A Review of Recent Advances in Drilling Mud Control, article in The Oil Weekly, November 23, 1942, pages 25, 26, 28, 32, 34, 36, 38, 40 and 42.

Perkins et al.: The Effect of Certain Gums and Starches On Filtration of Salt Water Muds at Elevated Temperatures, article in The Oil Weekly, November 2, 1942, page 45.